(12) United States Patent
do Nascimento

(10) Patent No.: US 6,543,271 B2
(45) Date of Patent: Apr. 8, 2003

(54) TOOLS USED IN CRIMPING MACHINES

(75) Inventor: Adão Luiz do Nascimento, São Paulo (BR)

(73) Assignee: Press Hold Industria E Comercio Ltda., Sao Paulo (BR)

( * ) Notice: Subject to any disclaimer, the term of this patent is extended or adjusted under 35 U.S.C. 154(b) by 14 days.

(21) Appl. No.: 09/814,718

(22) Filed: Mar. 23, 2001

(65) Prior Publication Data

US 2001/0023610 A1 Sep. 27, 2001

(30) Foreign Application Priority Data

Mar. 23, 2000 (BR) .............................................. 0001171

(51) Int. Cl.$^7$ ................................................ B21D 37/04
(52) U.S. Cl. ........................................ 72/481.1; 29/753
(58) Field of Search ............................... 29/753; 72/477, 72/481.1

(56) References Cited

U.S. PATENT DOCUMENTS

| | | | | |
|---|---|---|---|---|
| 2,662,287 A | * | 12/1953 | Ferguson ....................... 30/353 |
| 2,837,135 A | * | 6/1958 | Demler .......................... 72/477 |
| 3,429,172 A | * | 2/1969 | Lierse et al. .................. 72/358 |
| 3,946,145 A | * | 3/1976 | Warner .......................... 29/753 |

* cited by examiner

Primary Examiner—Lowell A. Larson
(74) Attorney, Agent, or Firm—Dickinson Wright PLLC

(57) ABSTRACT

IMPROVEMENTS MADE UP FOR TOOLS USED IN CRIMPING MACHINES, wherein the said tools bring a technical advance while compared to their basic operations, that is, for instance, the tool "guillotine and crimping" has multiplied its lifetime by six, i.e., sextupled the crimping applications of this tool; the "profile and crimping matrix support", which used to be a sole piece, brings a refill-blade; the assembly "hammer bar", which cuts, bends and prints the metal band in the crimping tools, allows for its hammer to be sharpen up to six times before its replacement, expanding its lifetime by six times, lowering the relative cost. The "anvil" tool, which helps the bending of the metal band, used to be in a sole milled piece, now are composed by two pieces fastened by themselves, wherein the cutting blade is twofold, lowering the cost and duplicating the tool lifetime.

11 Claims, 5 Drawing Sheets

FIGURE 1
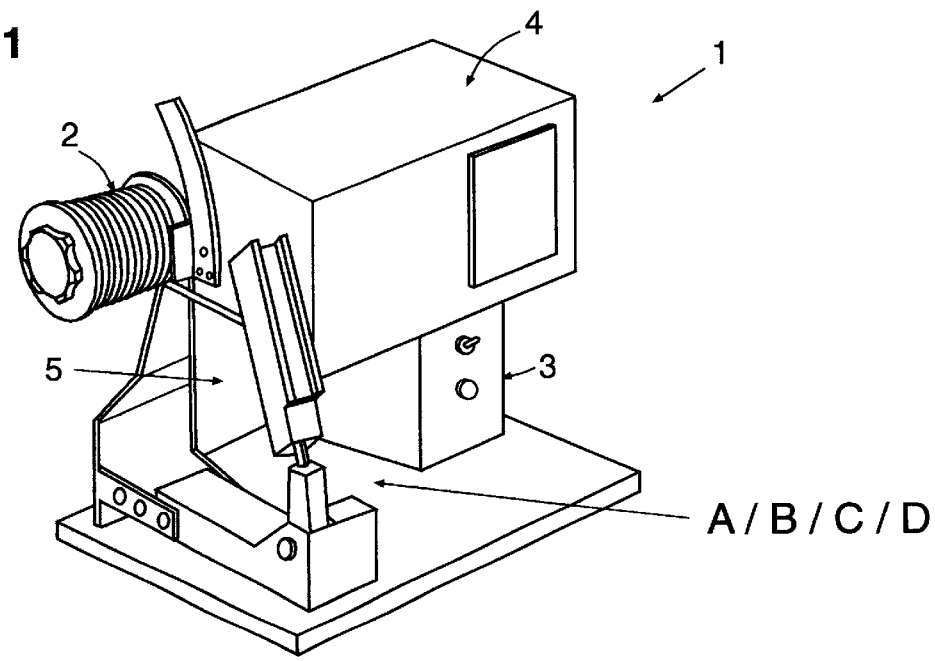
A / B / C / D
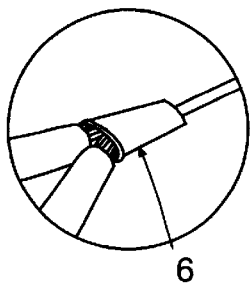
FIGURE 1a
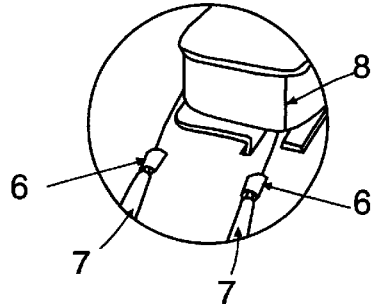
FIGURE 1b
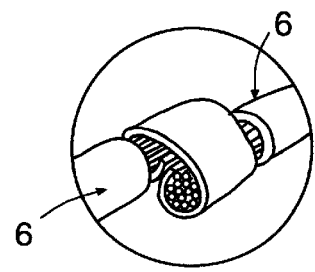
FIGURE 1c

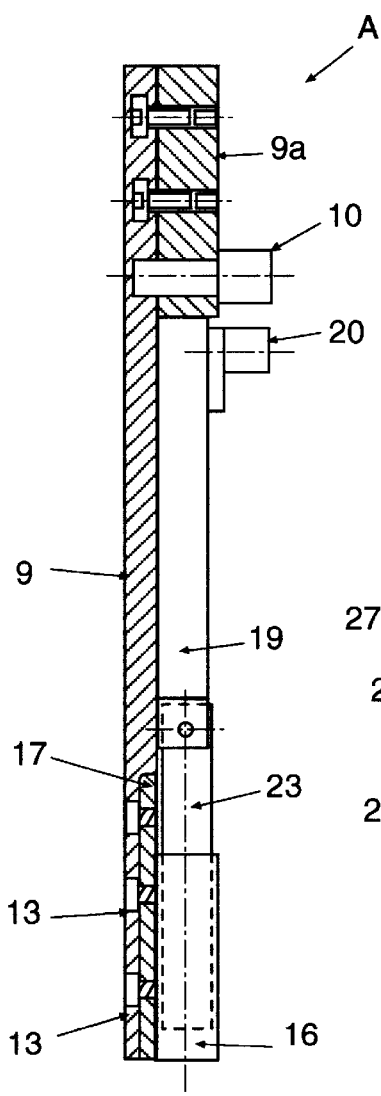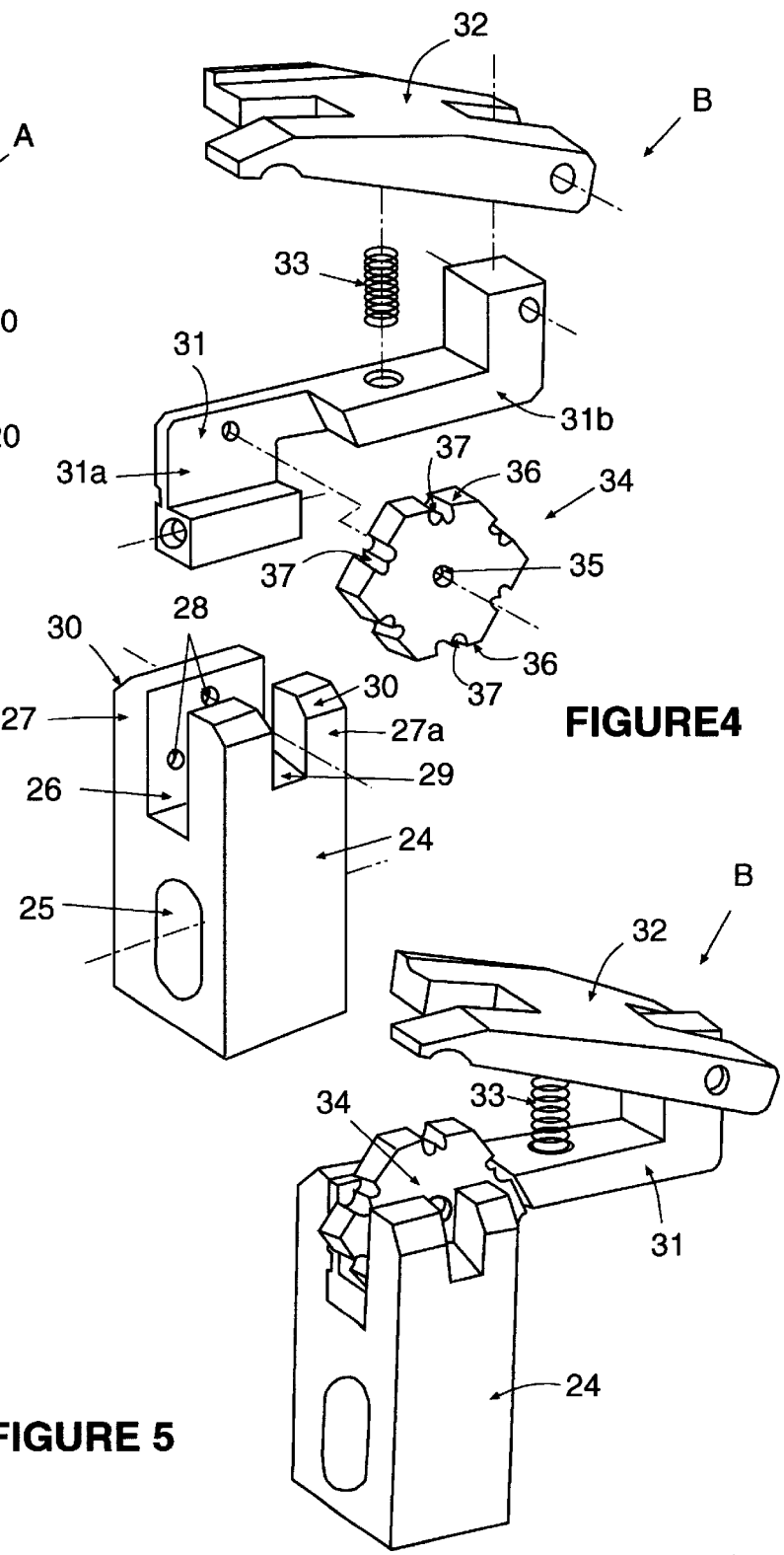

TOOLS USED IN CRIMPING MACHINES

TECHNICAL FIELD OF THE INVENTION

This invention relates to tools used in crimping machines and, more specifically, relates to improvements in tools used in crimping machines, which increase the productivity of the crimping machines, lower the costs involved in replacing worn out tools, and allow for higher efficiency and quality control of the executed connections.

BACKGROUND OF THE INVENTION

In the electric field, the connections between wire and wire, cable and cable, or cable and wire have been performed by a crimping system, which comprises a semiautomatic machine that, in a single operation, feeds, cuts, bends and crimps cables with wires or cables and wires with electric terminals for general applications.

A crimping machine generally includes an electrical module and a pneumatic module, which are associated with a support for a metal band reel which is fed into the support module of cutting tools.

The tool support module relates to the operating mechanism of crimping and, by this reason, allows for the exchange of tools, which are appropriate for each desired operation.

Although these machines are a technological improvement for making electrical connections, since it has completely replaced welding, they have considerable disadvantages in connection with the tools that they use. The machines use tools made from tool-steel. Each tool has an estimated life of about 300,000 crimpings, which means a one-month utilization period for an industry with a regular working hours. After this period has expired, the tool is discarded and replaced by a new one.

The tools are expensive to manufacture, because they are manufactured from prime materials of high quality and with precision. This considerably burdens small and medium manufacturers in the field.

SUMMARY OF THE INVENTION

The present invention overcomes the disadvantages of the prior art, and improves and increases the service life of the tools and thus the productivity of the crimping machines. The Applicant has developed improved tools for use in crimping machines, wherein each tool brings a technical advance when compared to the prior art. For example, the tool "guillotine and crimping" has increased the service life by six times, i.e., has increased the crimping applications of the tool by six times. The tool "profile and crimping matrix support", which used to be a sole piece, has a refill-blade, lowering by about 70% its cost of replacement in comparison with the prior art. The assembly "hammer bar", which cuts, bends and prints the metal band, makes it possible for the hammer to be sharpen up to six times before its replacement, expanding its lifetime by six times, lowering the costs. The "anvil" tool, which helps the bending of the metal band, used to be in a single milled piece, now include two pieces and two cutting blades, lowering the cost and doubling the tool service life.

As an example, the prior art tool "hammer bar," used for cutting, bending and printing the metal band, has a blade in one of its edges, a base lies for an eccentric piece (the hammer support), two guides at the other edge for the vertical sliding of the hammer. The blade, which corresponds to a steel bar provided with a sharp edge for the printing of the segments in the metal band, is fastened to the eccentric piece. In every printing, the cut segment is enclosed in the crimping tool, being automatically riveted in the cable or wire. The entire operation is done in a single hit.

Each time the hammer reached the end of its service life, it was replaced because the supporting tool is fastened to the machine with accurate adjustments. If the cutting edge of the hammer were sharpened, the distance between the band and the crimping tool would be modified. Thus, it was impracticable to sharpen the hammer, and it must be replaced.

In accordance with the improvements developed by the Applicant, the same tool is manufactured from a tool-steel bar, and is a support of the eccentric piece and the hammer. The tool is made in six different and standardized lengths, and compensating mechanisms are placed along the base piece of the tool, which mechanisms compensate for any sharpening provided to the hammer, in such a way as not to change the length of the whole set. Consequently, the working of the set is also not changed.

This aim is reached because the edge of the base piece is provided with a board to fasten the hammer guides and wedge or shock-absorbing plates (for compensation) which allow the variation of their sharpening. In this way, each time the guide reaches the end of its service life, the same is again brought to the manufacturer and sharpened, for example, by a 0.5 mm calculated each time, up to a five times in total. When returned to the supporting tool, compensation wedges are placed in the guide. The guides are duly adjusted in oblong hollows. Thus, a maximum sharpening up to 2.5 mm takes place, when the same are, finally, replaced by new ones. It is noted that, in such situation, a sole guide may be used six times more than the prior art guides.

Another illustrated example referring to the improvements of the present invention is related to the tool "guillotine-crimping". In the prior art, the tool has a parallelepiped base manufactured with a top head provided with a single matrix or crimping profile. The guillotine support and the guillotine are connected to the base.

At the end of the service life of the crimping profile, the entire piece is replaced, requiring installing a new base to the guillotine.

The Applicant, aiming to extended the tool's service life, has redesigned the base, providing it with not only a support for the guillotine, but also a six-sided piece, wherein a crimping profile is provided for each side of the piece. The six profiles may be the same or they may be different. The six-sided piece not only extends the service life by six times but also allows the change of the crimping profile by turning the piece.

With another piece, the proceeding undergoes the same way, that is, the special matrix for crimping bolt, most known as "Horn-Matrix", used to be a whole piece assembled in tool-steel, all tempered and corrected, containing a single crimping profile. After this profile reaches the end of its service life, the whole piece must be replaced.

The Applicant, following the previous way, has redesigned this piece. The new design includes two pieces. One piece is the base or the support while the other is a refill-blade including two crimping profiles in the edges. The two profiles may be identical, doubling its service life, or different, allowing for the flexibility of the two different operations. Such result is obtained by releasing a central axis-screw and equidistant in relation to the two profiles, turning the same and again screwing it.

It is noted on the above examples and on the previous explanations that tools lifetime reutilizing and extending is an important industrial application in the field of the crimping machines fed with metal band, because it allows for a large reduction of the relative cost, without losing the operation qualities and accuracy.

BRIEF DESCRIPTION OF THE DRAWINGS

For a better understanding, the present invention will be detailed as follows, making references to the attached drawings, given for exempla purposes, in which:

FIG. 1 is a perspective view, illustrating a crimping machine and some possible operations, shown in the details;

FIG. 3 is a side cut view of the "hammer bar" in accordance with the indication of the FIG. 2A;

FIGS. 4 and 5 illustrate the tool "guillotine and crimping", improved in accordance with the invention, in exploded perspective views and respectively assembled;

DETAILED DESCRIPTION OF THE PREFERRED EMBODIMENTS

Figure 2:
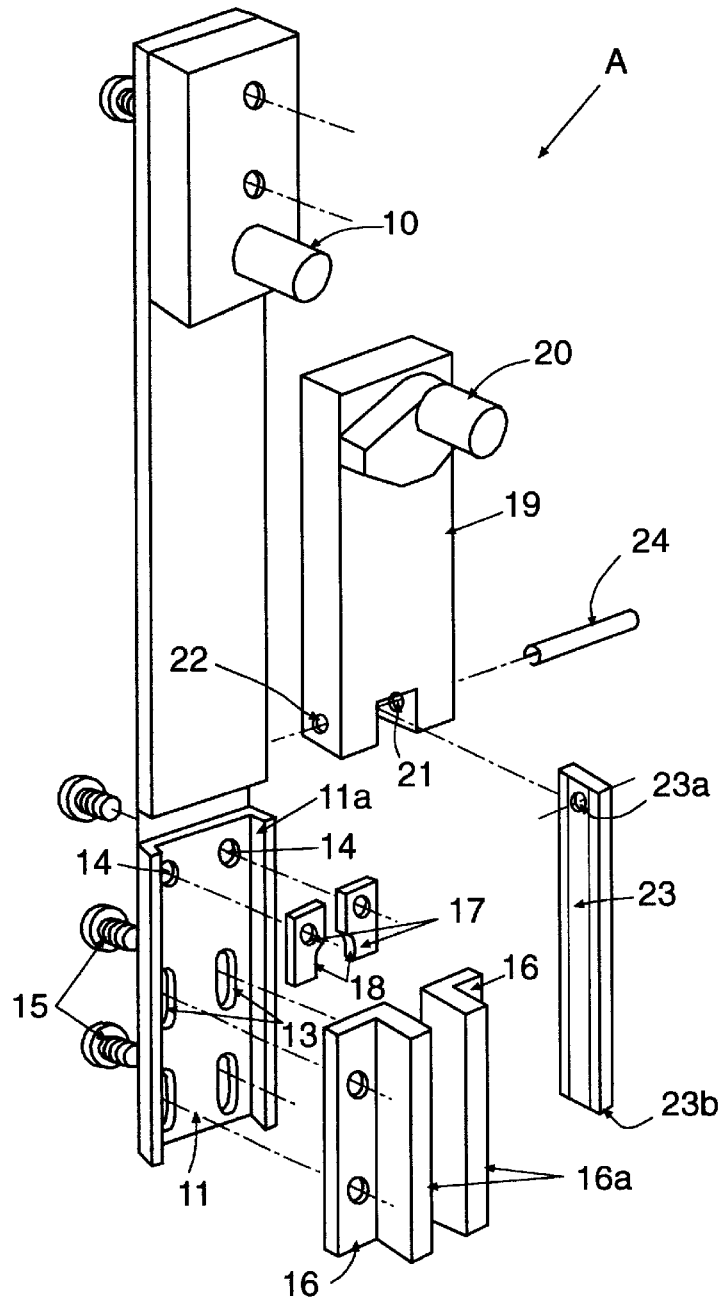
FIGS. 2 and 2A bring the tool "hammer bar" improved, viewed in perspective and respectively assembled.

In accordance with the illustrations described above, this present invention relates to tools used in crimping machines. A crimping machine may be a semiautomatic machine 1 fed with a metal band reel 2, which includes an electrical module 3, a framework 4 and a support module of tools 5, and is able to fasten several tools which feed, cut, bend and crimp the cables and wires 6 between themselves or cables 7 and wires 6 with electrical terminal 8.

Figure 2A:
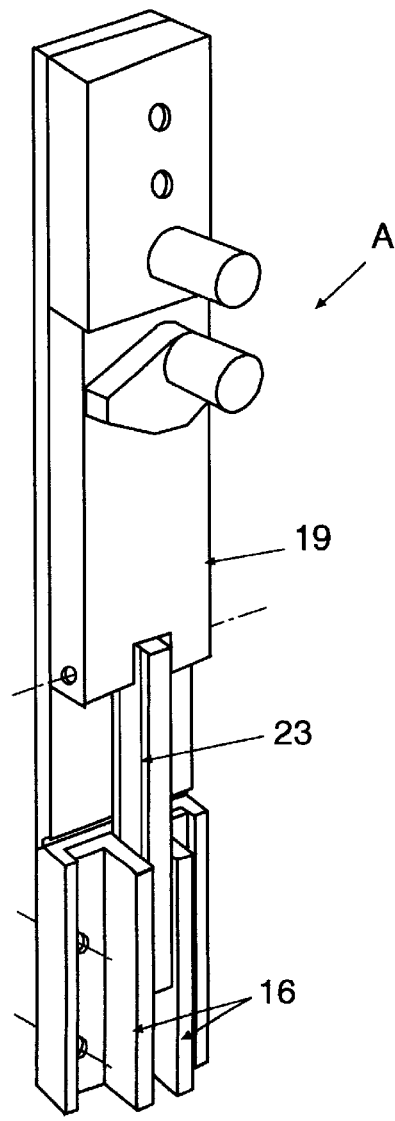

According to the present invention, a tool A, as shown in FIGS. 2, 2A and 3, is provided with a laminate support bar 9, which has an enlarged edge 9a with screwed hollows for fastening the support module 5, from which edge an orthogonal bolt 10 protrudes, and a thin edge that has a lower area 11 and parallel sides 11a. The lower area has four oblong hollows 13 and two holes 14. In the oblong hollows 13, two guides 16 are fastened by means of screws 15 in an "L" shape resemblance, which keep an appropriate space between their parallel sides 16a. Compensation wedges 17 are fastened in the holes 14, the said wedges being provided with a rounded slope 18 in one of the apexes. In the passage below the enlargement 9a, lies a quadrilateral piece 19 with an eccentric axis 20 and a split 21 with a through hole 22, which are provided for the enclosing and fastening of a "hammer" 23 which is a bar made from special steel. An elastic bolt 24 extends through holes 22 and a hole at one end 23a of the "hammer" 23, and the other end 23b of the "hammer" 23 is sharpened for printing the metal band in the crimping tools, described below.

The present tool has six pairs of compensation wedges 17 of different dimensions, the difference between each pair being 0.5 mm, so that the hammer 23 may be sharpened six times, by 0.5 mm each time, before the hammer 23 is replaced.

The oblong hollows 13 allow for the gradual adjustment of the guides 16, adjusting them in relation to the hammer sharpening 23 and the corresponding wedges 17.

Shown in FIGS. 4 and 5 is another tool B of the present invention, which tool comprises a parallelepiped support 24 provided with an oblong hole 25 used to fasten the support 24 to the machine 1. The support 24 includes a longitudinal split 26 on the top with two sides 27 27a, wherein threaded holes 28 are provided with in the side 27 while a short central lower area 29 is provided in the side 27a. Both external sides edges 27 and 27a are sloped 30.

In the split base 26 and fastened to the holes 28 is a guillotine carrier 31 having a laminate passage 31a and a strong passage 31b wherein the guillotine 32 itself is fastened. A compression spring 33 biases the guillotine 32 against the guillotine carrier 31. A six bladed laminate piece 34 is fastened, using a central hole 35, in the laminate passage 31a within the split 26 interior. The laminate piece 34 has six angles 36 in which crimping profiles 37 are manufactured.

The referred piece 34 may have its angles 36 with crimping 37 manufactured with identical or different profiles, varying the application.

Figure 8:
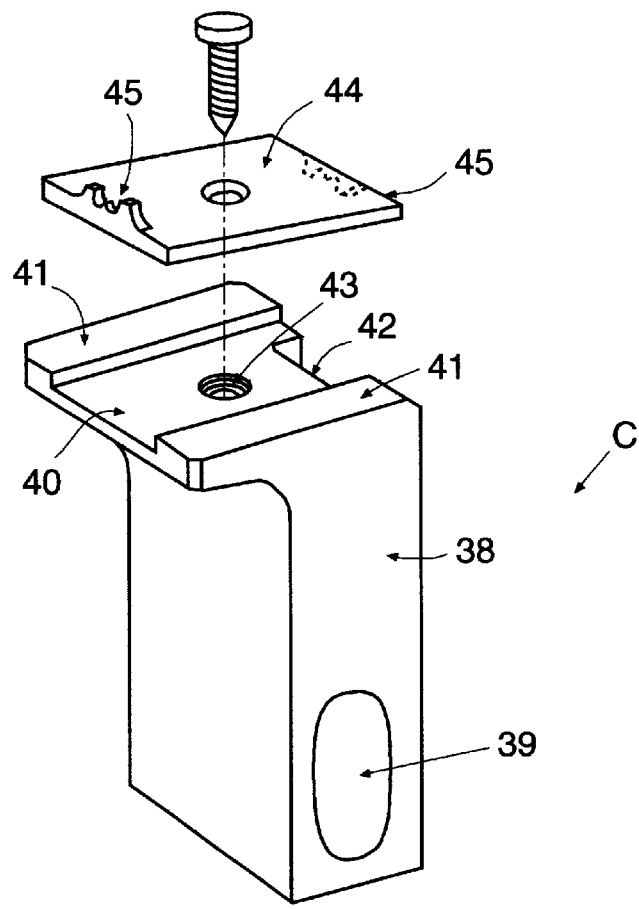
FIGS. 8, 9 and 10 bring the tool "horn-matrix" viewed in exploded perspective and respectively assembled.
Figure 9:
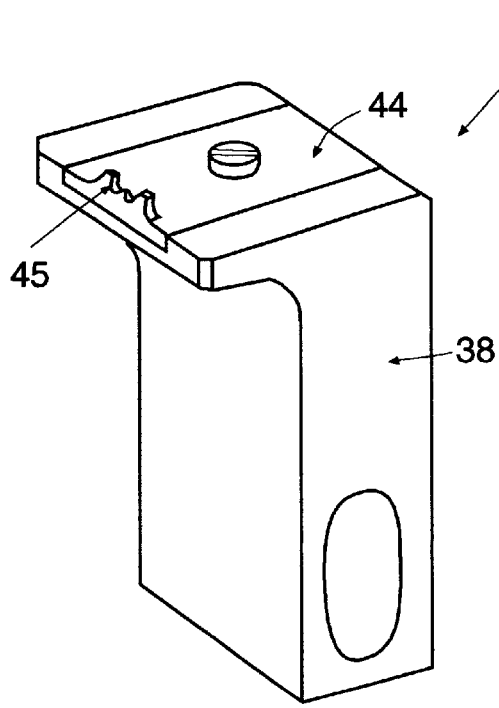
Figure 10:
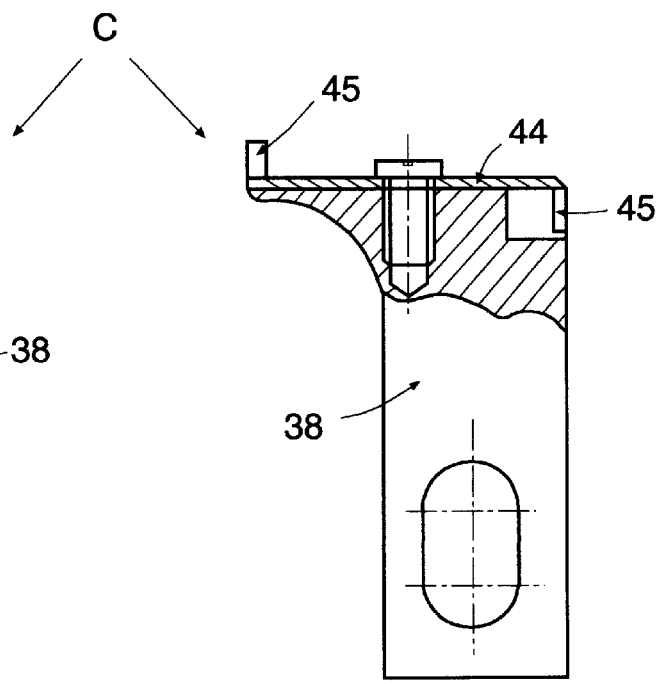

FIGS. 8, 9 and 10 illustrate yet another embodiment of the present invention. This embodiment, tool C, comprises an "L" shape support 38 with a oblong hole for fastening the support 38 to the machine 1, whereby the top flat horizontal surface of the referred support 38 is provided with a slightly lower area 40, producing parallel sides 41, wherein the slightly lower area is provided with a splitable teeth 42 and with a threaded hole 43. The manufactured blade 44 with the profile crimping 45 is fastened to this hole 43. Only the blade 44 is replaced when its operation life ends.

Figure 6:
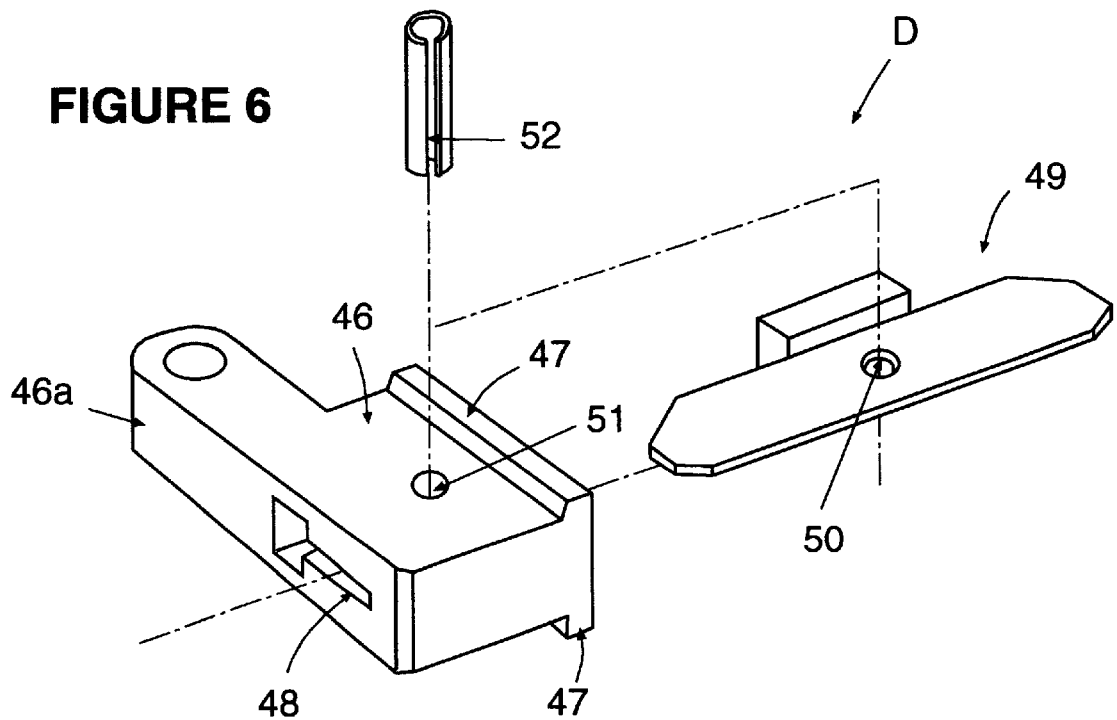
FIGS. 6 and 7 bring illustrations in exploded and assembled perspective of the tool "support for the double anvil and refill-blade of the double anvil"
Figure 7:
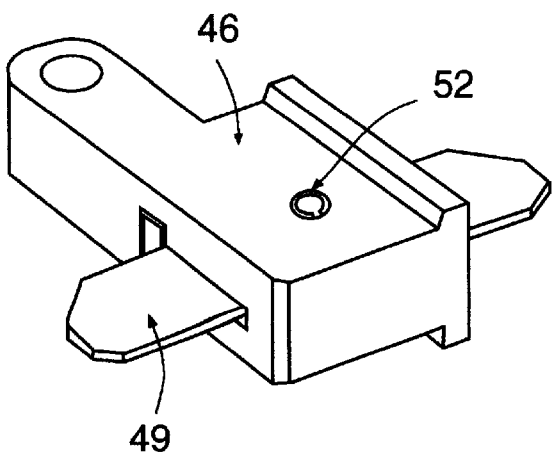

FIGS. 6 and 7 illustrate a further tool D of the invention. The tool D includes a parallelepiped support 46 having an extended passage 46a for fastening the printing tool or other and, in its quadrangular passage, two short external protrusions 47, which functions as ranging guides. A "T" shape tear is provided in the internal, central and orthogonal position to the guides 47 for the placing of a double blade 49. The double blade 49 is provided with a hollowed out aperture 50 concentric to the hollowed out aperture 51 of the support 46, wherein both apertures are trespassed by an elastic bolt 52 which fastens the pieces between themselves.

The referred double blade 49 has first a side of its cutting area worn out. As soon as its lifetime is expired, the same is turned inside out for a new consumption of the other cutting, in this way duplicating its operating life.

Although the invention has been detailed, it is important to understand that the same do not limit its application to the details and phases herein described. The invention can be used in other ways as well as to be assembled and executed in a wide range of ways. It must be understood the terms herein used are made only for a description purposes and not to any kind of limitation.

What is claimed is:

1. A tool for use in a crimping machine comprising:
   a support bar having an enlarged first edge and a second edge;
   a member having an eccentric axis and being arranged adjacent to the enlarged first edge of the support bar;
   a hammer having first and second edges, the first edge of the hammer being attached to the member and the second edge of the hammer being sharpened for printing;
   two guides connected to the support bar near the second edge of the support bar, each guide having a parallel side, the parallel sides of the guides being spaced apart; and
   a plurality of pairs of compensation wedges of different dimensions, each pair of compensation wedges being attachable to the support bar, one of the pairs of compensation wedges being arranged between the hammer and the two guides.

2. The tool of claim 1, wherein the plurality of pairs of compensation wedges includes six pairs of compensation wedges whose lengths vary by an increment of 0.5 mm.

3. The tool of claim 1, wherein each wedge has a rounded slope.

4. The tool of claim 1, wherein the support bar includes a plurality of substantially oblong holes near its second edge, and the guides are bolted to the support bar through the oblong holes, whereby the oblong holes allow the adjustment of the position of the guides in accordance with the length of the compensation wedges.

5. A tool for use in a crimping machine comprising:
   a support;
   a guillotine-carrier assembly comprising a guillotine carrier, a guillotine pivotably connected to the guillotine carrier, and a spring disposed between the guillotine carrier and guillotine, wherein the guillotine carrier and guillotine are spaced apart by the spring; and
   a laminate member mounted on the support, the laminate member having multiple bladed sides, each bladed side having a crimping profile.

6. The tool of claim 5, wherein a support having a groove is provided, and the laminate member is mounted in the groove.

7. The tool of claim 5, wherein the guillotine carrier has a laminate passage and a strong passage, wherein the guillotine is pivotably connected to the strong passage.

8. The tool of claim 5, wherein the bladed sides of the laminate member have different crimping profiles.

9. A tool for use in a crimping machine comprising:
   a generally L-shaped support having a generally flat top with a cantelever portion, comprising a groove having a bottom surface, the bottom surface having a splitable teeth; and
   a blade removeably disposed in the groove having first and second crimping profiles extending in opposite directions, wherein the blade is reversible and can be turned over when said first crimping profile is worn, to allow the second crimping profiled to be used.

10. The tool of claim 9, wherein the blade has first and second ends and the first and second crimping profiles are extended from said ends, the first crimping profile being disposed at the first end, and the second crimping profile being disposed at the second end.

11. A tool for use in a crimping machine comprising:
    a parallelepiped support having two external protrusions, and a T-shaped tear; and
    a double blade extending through the T-shaped tear and being connected to the parallelepiped support, said double blade having an edge on opposite sides thereof, wherein the double blade is adapted to be inserted in a first position in said T-shaped tear, to allow one of the edges to be employed, and in a second position in said T-shaped tear, to allow another of the edges to be employed.

* * * * *